(12) United States Patent
Fly

(10) Patent No.: US 7,770,870 B1
(45) Date of Patent: Aug. 10, 2010

(54) TOW BALL WINCH MOUNT

(76) Inventor: David E. Fly, 316 W. 21st Ave., Menomonie, WI (US) 54751

( * ) Notice: Subject to any disclaimer, the term of this patent is extended or adjusted under 35 U.S.C. 154(b) by 194 days.

(21) Appl. No.: 12/229,394

(22) Filed: Aug. 22, 2008

(51) Int. Cl.
*B66D 1/00* (2006.01)
(52) U.S. Cl. .................... 254/323; 280/507; 280/491.5; 280/477; 224/512; 224/520
(58) Field of Classification Search ................ 254/323; 280/506, 507, 491.3, 491.5, 477, 478.1; 224/512, 224/520
See application file for complete search history.

(56) References Cited

U.S. PATENT DOCUMENTS

| 4,194,755 | A | * | 3/1980 | Youngblood | 280/402 |
| 4,799,705 | A | * | 1/1989 | Janes et al. | 280/477 |
| 5,072,962 | A | * | 12/1991 | Webb | 280/414.1 |
| 5,193,838 | A | * | 3/1993 | Olson | 280/515 |
| 5,288,096 | A | * | 2/1994 | Degelman | 280/508 |
| 5,314,202 | A | * | 5/1994 | Wilkins, Jr. | 280/511 |
| 5,913,507 | A | * | 6/1999 | Lauricella, Jr. | 254/325 |
| 5,971,177 | A | | 10/1999 | Carter | |
| 6,131,938 | A | | 10/2000 | Speer | |
| 6,193,218 | B1 | * | 2/2001 | Philyaw | 254/326 |
| 6,386,514 | B1 | | 5/2002 | Ray | |
| 6,511,089 | B1 | | 1/2003 | Kores, Sr. | |
| 6,523,806 | B2 | | 2/2003 | Bartal | |
| 6,651,960 | B1 | | 11/2003 | Koester | |
| 6,685,204 | B1 | | 2/2004 | Hehr | |
| 6,951,345 | B2 | * | 10/2005 | Wilks | 280/477 |
| 6,979,016 | B1 | | 12/2005 | Wegener | |
| 7,147,415 | B2 | | 12/2006 | Rorie et al. | |
| D556,420 | S | | 11/2007 | Trihey et al. | |
| 2006/0170193 | A1 | * | 8/2006 | Brown | 280/476.1 |
| 2007/0052207 | A1 | * | 3/2007 | Olson | 280/515 |
| 2007/0108731 | A1 | * | 5/2007 | McBroom | 280/477 |
| 2007/0235982 | A1 | * | 10/2007 | Cumbie | 280/478.1 |

FOREIGN PATENT DOCUMENTS

EP 282688 A1 * 9/1988

* cited by examiner

*Primary Examiner*—Emmanuel M Marcelo
(74) *Attorney, Agent, or Firm*—www.bobharter.com; Robert J. Harter

(57) ABSTRACT

A portable winch system mounted to a standard trailer hitch tow ball of a vehicle permits steep incline pulling angles of the winch without cutting into the neck portion of the tow ball. To achieve a broad range of inclination angles, the cup plate (socket that fits over the tow ball) and/or the ball-locking portion of the winch system includes relieved neck-clearance areas. In some embodiments, the cup plate and/or ball-locking mechanism includes neck contact points that are softer than the material of the tow ball.

13 Claims, 5 Drawing Sheets

TOW BALL WINCH MOUNT

FIELD OF THE INVENTION

The subject invention generally pertains to winches and more specifically to a winch mountable to a tow ball normally used for a trailer hitch.

BACKGROUND OF RELATED ART

U.S. Pat. No. 6,386,514 discloses how a winch can be attached to a vehicle's trailer hitch ball, also known as a tow ball. Examples of vehicles include, but are not limited to, cars trucks, ATVs, snowmobiles, buggies, airboats, tanks, wreckers, tow trucks, logging equipment, construction equipment, utility equipment, agricultural equipment, military vehicles, and rescue equipment. Attaching a winch to a vehicle, as shown in the '514 patent, can be useful in situations where the winch is pulling in a direction that is generally horizontal or level with the vehicle. In some cases, however, the vehicle may be stuck in a deep ditch or gully, and a winch might need to pull upward at a significant incline in order to pull the vehicle out.

A winch pulling at an upward angle, rather than horizontally, can apply a damagingly high bending moment on the vehicle's chassis, bumper, and receiver and ball mount. The receiver and ball mount is the hardware that typically connects the tow ball to the vehicle. If a cup plate (also known as a trailer coupler, which is the socket that fits over the tow ball) is tilted up or down relative to the tow ball, the ball locking mechanism within the cup plate or edges on the cup plate itself can possibly cut into the neck portion of the tow ball and do permanent damage.

Consequently, a need exists for a safer way of quickly connecting a winch to a vehicle's tow ball.

SUMMARY OF THE INVENTION

It is an object of the present invention to provide a winch system that can be safely coupled to a vehicle's tow ball.

Another object of some embodiments is to provide a ball-engaging cup plate, to which the winch is mounted, with relatively soft edges that avoid cutting into the neck portion of the tow ball.

Another object of some embodiments is to make the edges with a Brinell hardness of less than 100 BHN, thereby reducing the likelihood of the edges scratching or cutting into a tow ball made of steel.

Another object of some embodiments is to provide a cup plate with one or more neck-clearance notches that enable the cup plate to pivot at steeper angles relative to the tow ball.

Another object of some embodiments is to cover one or more ball-engaging edges of a cup plate with relatively soft bumpers.

Another object of some embodiments is to attach a shackle to a cup plate, wherein the shackle is pivotal to serve the dual purpose of enabling a cradle sling hookup and providing a centrally balanced carrying handle.

Another object of some embodiments is to attach a hook of a winch from one vehicle to a shackle that is on a cup plate mounted to a second vehicle.

One or more of these and/or other objects of the invention are provided by a winch mountable to a tow ball, wherein the winch system includes means for accommodating relatively steep pulling angles of the winch.

DESCRIPTION OF THE PREFERRED EMBODIMENT

Figure 1:
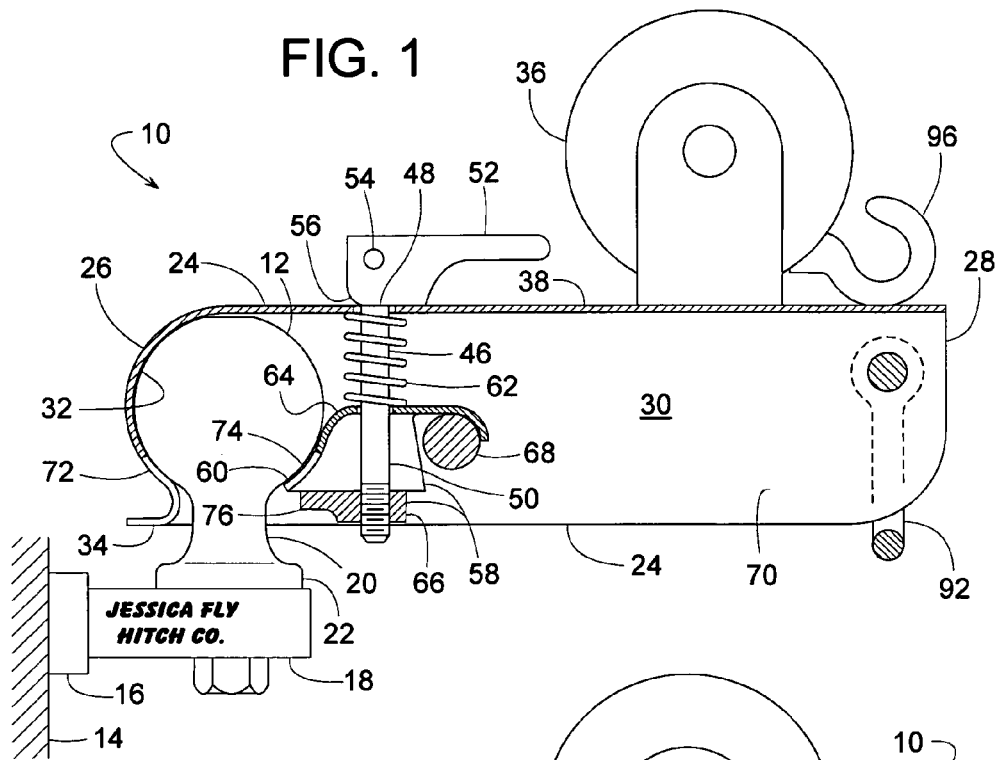
FIG. 1 is a side view partially in cross-section showing a winch system in a lock position.

FIGS. 1-6 show a winch system 10 connected to a tow ball 12 of a vehicle 14. Although there are many ways of connecting a tow ball to a vehicle, in the illustrated example, vehicle 14 includes a receiver 16 in which a ball mount 18 is inserted. Tow ball 12, in this example, includes a neck portion 20 and a base flange 22 bolted to ball mount 18.

Winch system 10 comprises a cup plate 24 having a front end 26 and a back end 28. Cup plate 24 defines a hollow interior 30, and front end 26 defines a ball-receiving socket 32 with a rim 34, wherein ball-receiving socket 32 is an extension of the hollow interior 30.

Figure 5:
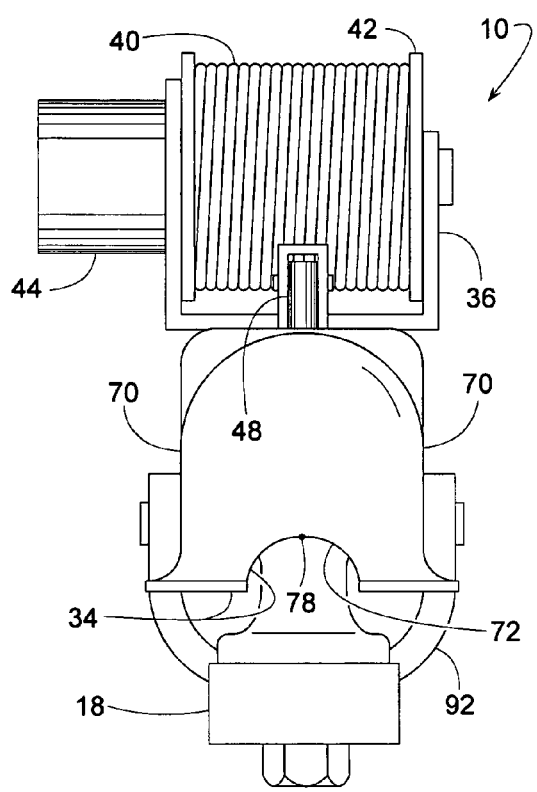
FIG. 5 is a left end view of FIG. 1.

Winch system 10 also includes a winch 36 mounted to an upper surface 38 of cup plate 24. Although FIG. 5 shows winch 36 with a cable 40 (FIGS. 5 and 6) wrapped around a drum 42 powered by an electric motor 44; alternatively, winch 36 could be powered manually, hydraulically or pneumatically. Also, cable 40 could instead be a rope, chain, strap or any other flexible elongate member.

Figure 2:
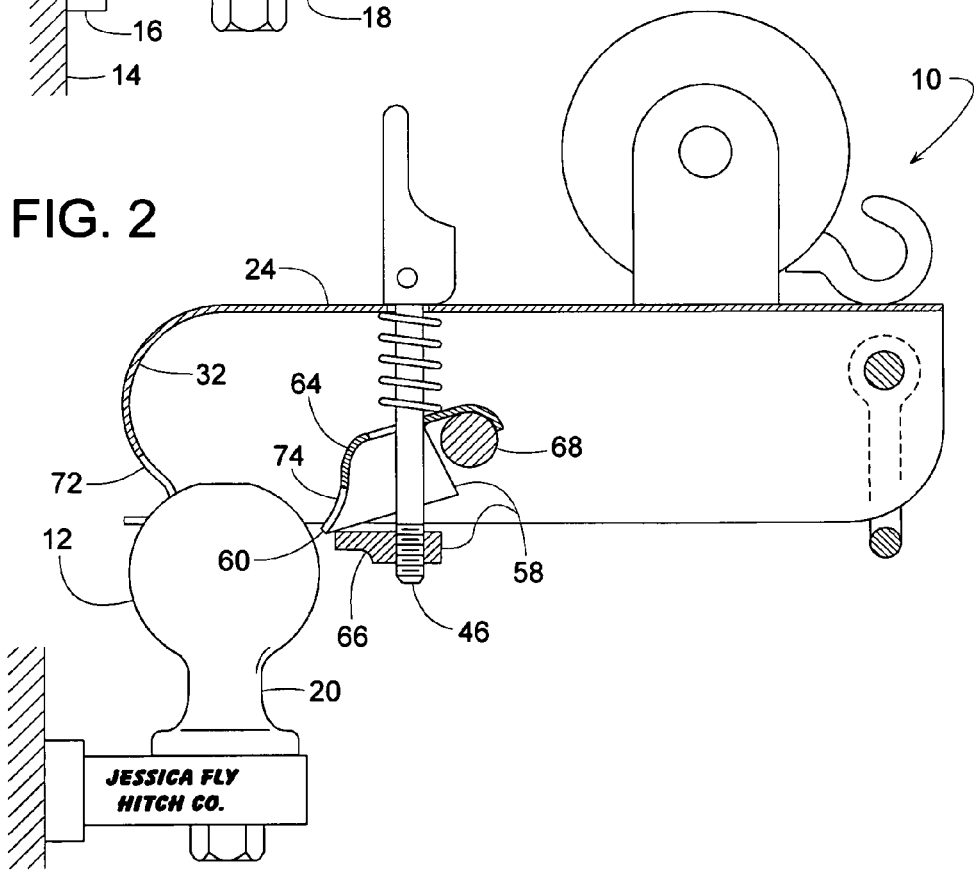
FIG. 2 is a view similar to FIG. 1 but showing the winch system in a release position.

To selectively lock or release tow ball 12, winch system 10 includes a draw pin 46 having an upper end 48 and a lower end 50. Lower end 50 extends into hollow interior 30 of cup plate 24. A lever 52 coupled to upper end 48 of draw pin 46 is manually pivotal about a pin 54 such that a cam end 56 of lever 52 acts upon surface 38 to selectively raise and lower draw pin 46 between a lock position (FIG. 1) and a release position (FIG. 2). A ball-engaging retainer 58 is connected to lower end 50 of draw pin 46 so that when draw pin 46 is in the lock position of FIG. 1, a lower lip 60 of retainer 58 engages tow ball 12 to trap tow ball 12 within ball-receiving socket 32. When draw pin 46 is in the release position of FIG. 2, retainer 58 releases tow ball 12 from within ball-receiving socket 32. A compression spring 62 helps hold cam end 56 down against upper surface 38 and urges retainer 58 away from ball 12 when draw pin 46 is in the release position.

Figure 7:
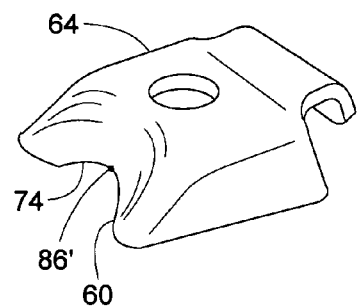
FIG. 7 is a perspective view of a winch system component.
Figure 8:
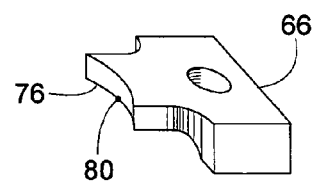
FIG. 8 is a perspective view of another winch system component.

Although the actual design of retainer 58 may vary, in some embodiments, retainer 58 comprises a ball lock 64 (FIG. 7) and an internally threaded nut 66 (FIG. 8). In this example, ball lock 64 is the part of retainer 58 that engages and captures tow ball 12 in the lock position. Nut 66 is screwed onto lower end 50 of draw pin 46 so that pin 46 can pull ball lock 64 upward upon pin 46 moving from the release position of FIG. 2 to the lock position of FIG. 1. When ball lock 64 is lifted by draw pin 46, ball lock 64 pivots about a horizontal pin 68 that is affixed to the two sidewalls 70 of cup plate 24.

Figure 6:
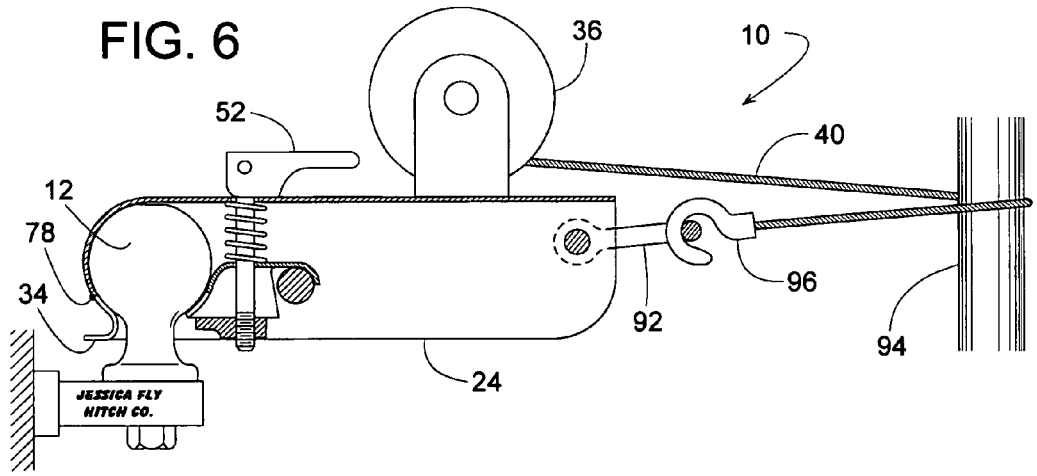
FIG. 6 is a side view showing the winch system in a cradle sling hookup.

Since a winch mounted to a vehicle might be used for pulling the vehicle up and out of a ditch or gully, the winch's angle of pull can vary widely and be quite steep. To accommodate such angles, winch system 10 is designed to allow cup plate 24 to pivot between the positions of FIGS. 3 and 4. Referring to FIGS. 5, 6 and 7 rim 34 has a first neck-clearance notch 72, and/or lower lip 60 has a second neck-clearance notch 74, which allow cup plate 24 to pivot farther than what would otherwise be possible.

Figure 3:
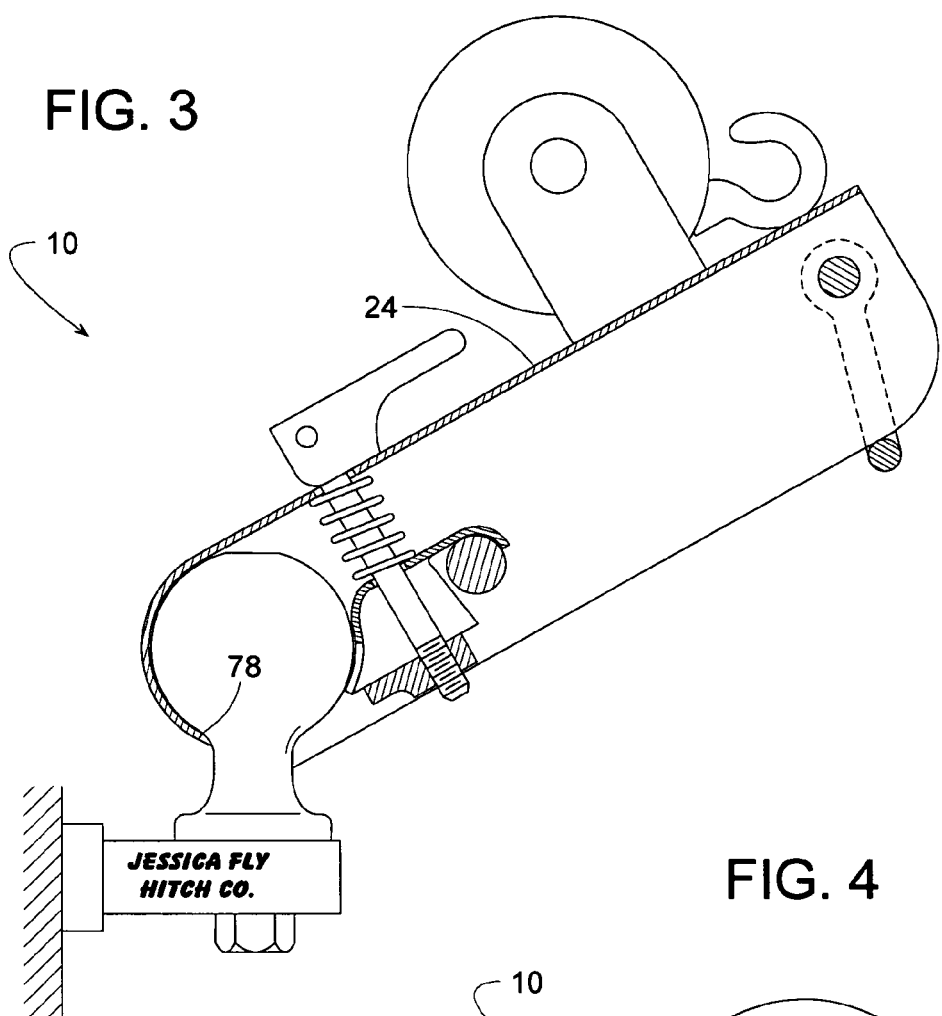
FIG. 3 is a view similar to FIG. 1 but showing the winch system tilted at its upper limit of inclination.
Figure 4:
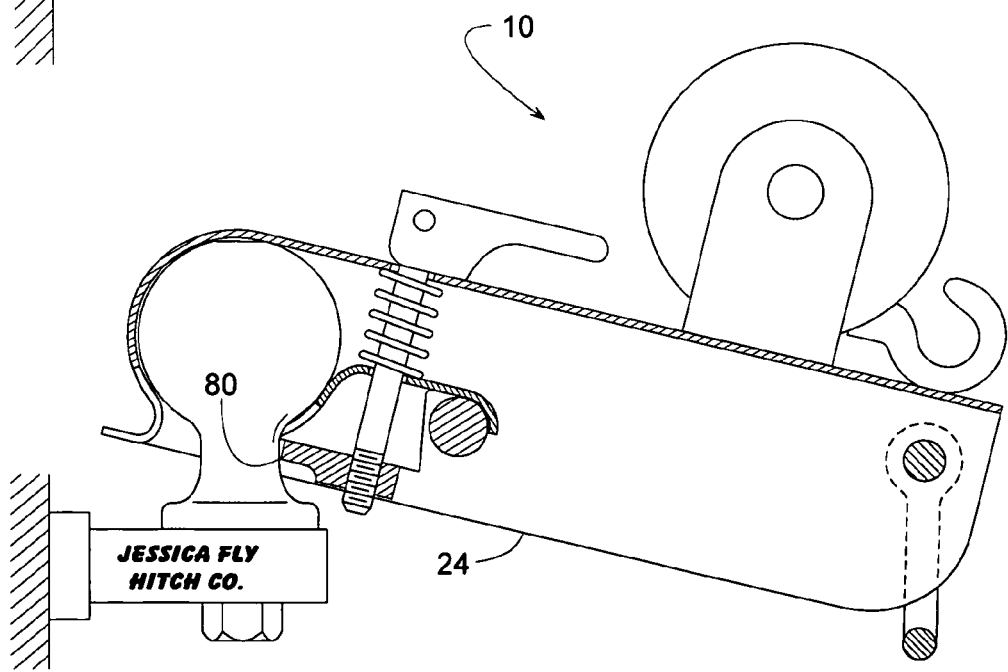
FIG. 4 is a view similar to FIG. 1 but showing the winch system tilted at its lower limit of inclination.

To prevent neck portion 20 of tow ball 12 from being damagingly scratched or cut by rim 34 of cup plate 24, lower lip 60 of ball lock 64, or a lower lip 76 of nut 66; winch system 10 includes one or more safety features. In some embodiments, the upward inclination of cup plate 24 is limited by rim 34 contacting neck 20 at point 78, as shown in FIG. 3. Point 78 is also shown in FIGS. 5 and 6. To protect neck 20 from damage, rim 34 at point 78 can be of a material that is softer than a standard steel tow ball. Rim 34, for example, can be made of a material having a Brinell hardness of less then 100 BHN, which can be achieved with various materials including, but not limited to, aluminum, copper, and alloys thereof. Lower lip 76 of nut 66, which is show engaging neck 20 at point 80 in FIG. 4, can also be made of a material having a Brinell hardness of less then 100 BHN. Point 80 is also shown in FIG. 8.

Figure 9:
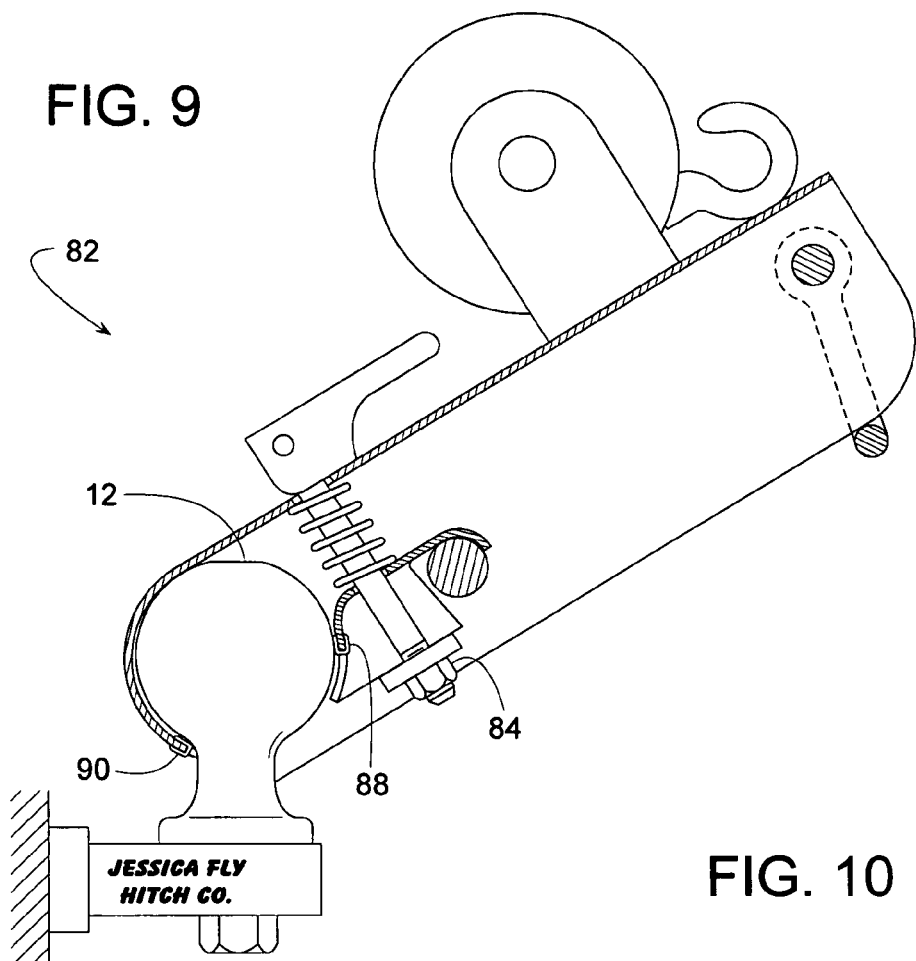
FIG. 9 is a view similar to FIG. 3 but showing an alternate embodiment.
Figure 10:
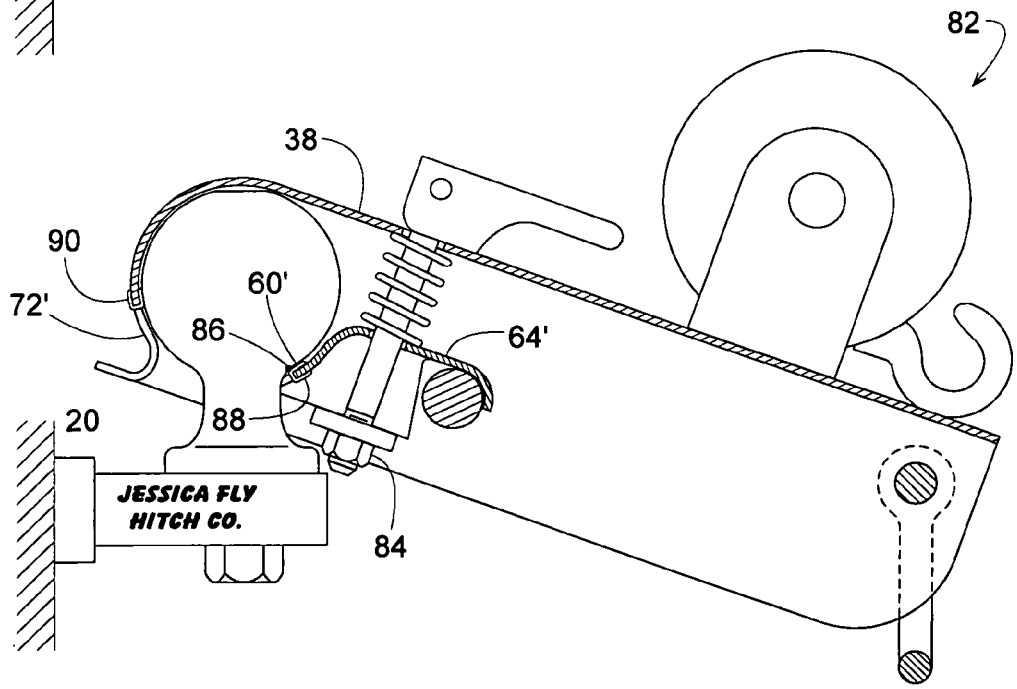
FIG. 10 is a view similar to FIG. 4 but showing the embodiment of FIG. 9.
Figure 11:
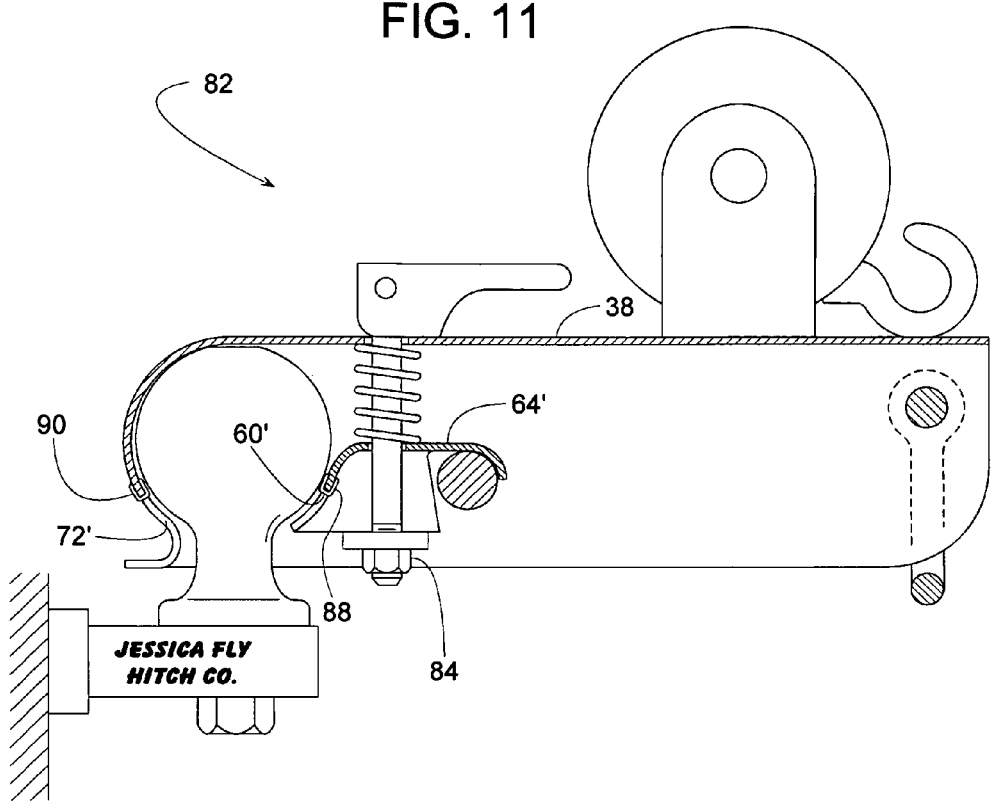
FIG. 11 is a view similar to FIG. 1 but showing the embodiment of FIGS. 9 and 10.

If instead of nut 66, a winch system 82 includes a standard hex nut 84, as shown in FIGS. 9-11. In this example, lower lip 60' of ball lock 64' engages neck 20 at point 86, as shown in FIG. 10. A comparable point 86' is shown in FIG. 7. In this case, neck 20 can still be protected by making lower lip 60' of ball lock 64' of a material having a Brinell hardness of less then 100 BHN. Although the entire ball lock 64' can be made of a relatively soft material, in some cases, ball lock 64' is made of steel with an added soft bumper 88 that has a Brinell hardness of less than 100 BHN. Examples of acceptable bumper materials include, but are not limited to, polymeric materials, aluminum, copper, and various aluminum and copper alloys.

A bumper 90 similar to bumper 88 can also be added to neck-clearance notch 72' on cup plate 38, as shown in FIGS. 9-11.

Winch systems 10 and 82 preferably include a hook-receiving ring 92 on cup plate 24 to serve as a convenient carrying handle and to facilitate a cradle sling hookup where cable 40 can wrap around an anchor 94 (e.g., a tree or pole, or sheave or pulley connected thereto) and hook back onto ring 92, as shown in FIG. 6. Such a cradle sling hookup basically doubles the pulling force provided by winch 36. Positioning ring 92 at the back end of cup plate 24 with winch 36 being generally between ring 92 and lever 52 (or between ball 12 and ring 92) provides even load distribution with minimal strain on cup plate 24. Ring 92 is preferably pivotal (e.g., a shackle) so that ring 92 can extend outward for carrying and cradle sling use, and hang downward when not in use.

Figure 12:
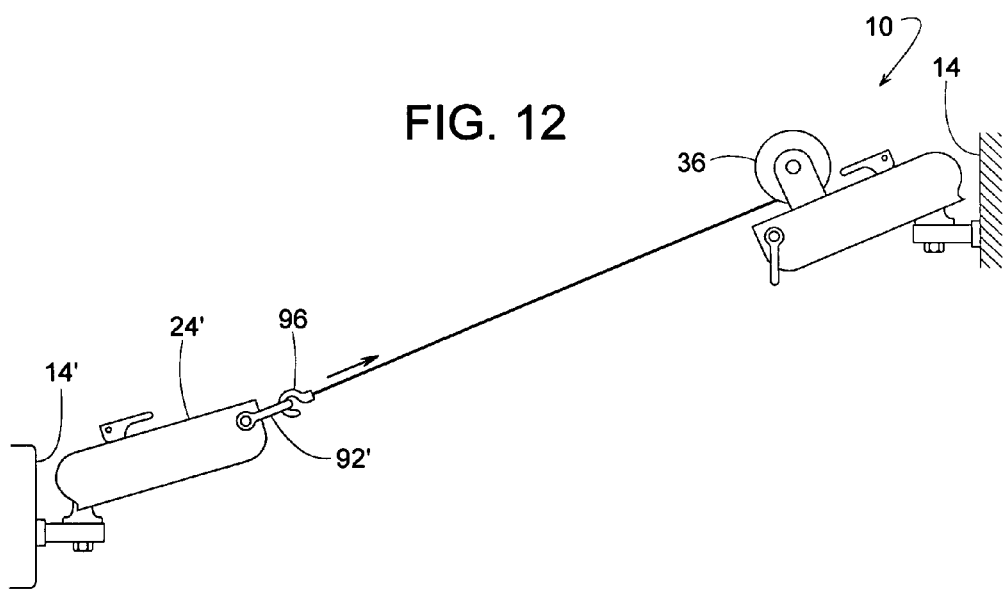
FIG. 12 is a side view showing one example of the winch system in use.

FIG. 12 shows another example of how the winch system can be used. In this example vehicle 14 and winch system 10 are being used for pulling a second vehicle 14' up and out from a ditch or gully. A hook 96 from winch 36 of vehicle 14 hooks onto a ring 92', which is connected to a cup plate 24' of vehicle 14'. Although FIG. 12 shows that a winch is not mounted to cup plate 24', mounting a winch to cup plate 24' can certainly be done if so desired.

Although the invention is described with respect to a preferred embodiment, modifications thereto will be apparent to those of ordinary skill in the art. The scope of the invention, therefore, is to be determined by reference to the following claims:

The invention claimed is:

1. A winch system adapted to quickly and easily connect to a tow ball of a vehicle, wherein the tow ball includes a neck portion and a base flange, the winch system comprising:
   a cup plate having a front end and a back end, the cup plate defines a hollow interior, the front end defines a ball-receiving socket with a rim, the ball-receiving socket is an extension of the hollow interior;
   a winch mounted to the cup plate;
   a draw pin having an upper end and a lower end, the lower end extends into the hollow interior of the cup plate;
   a lever coupled to the upper end of the draw pin, the lever is pivotal relative to the cup plate to move the draw pin between a lock position and a release position;
   a retainer connected to the lower end of the draw pin such that:
   a) when the draw pin is in the lock position and the tow ball is within the ball-receiving socket, a lower lip of the retainer engages the tow ball to trap the tow ball within the ball-receiving socket, and
   b) when the draw pin is in the release position, the retainer releases the tow ball from within the ball-receiving socket; and
   at least one of the rim and the lower lip has a Brinell hardness number of less than 100 BHN and the retainer comprises a nut and a ball lock, the draw pin extends through the ball lock, the nut threadingly engages the lower end of the draw pin, the ball lock engages the tow ball when the tow ball is within the ball-receiving socket with the draw pin in the lock position.

2. The winch system of claim 1, wherein at least one of the rim and the lower lip is comprised of a material that includes at least some aluminum.

3. The winch system of claim 1, wherein at least one of the rim and the lower lip is comprised of a material that includes at least some copper.

4. The winch system of claim 1, wherein the rim includes a polymeric bumper.

5. The winch system of claim 1, wherein the lower lip includes a polymeric bumper.

6. The winch system of claim 1, wherein the nut engages the tow ball to allow but also limit a degree to which the cup plate can pivot relative to the tow ball when the tow ball is within the ball-receiving socket with the draw pin in the lock position.

7. A winch system adapted to quickly and easily connect to a tow ball of a vehicle, wherein the tow ball includes a neck portion, the winch system comprising:
   a cup plate having a front end and a back end, the cup plate defines a hollow interior, the front end defines a ball-receiving socket with a rim, the ball-receiving socket is an extension of the hollow interior;
   a winch mounted to the cup plate;
   a draw pin having an upper end and a lower end, the lower end extends into the hollow interior of the cup plate;
   a lever coupled to the upper end of the draw pin, the lever is pivotal relative to the cup plate to move the draw pin between a lock position and a release position;
   a retainer connected to the lower end of the draw pin such that:
   a) when the draw pin is in the lock position and the tow ball is within the ball-receiving socket, a lower lip of the retainer engages the tow ball to trap the tow ball within the ball-receiving socket, and b) when the draw pin is in the release position, the retainer releases the tow ball from within the ball-receiving socket; and at least one neck-clearance notch defined by the winch system and being at a position to receive the neck portion of the tow ball when the tow ball is within the ball-receiving socket, wherein at least one of the following is true:

a) the rim of the ball-receiving socket defines a first neck-clearance notch such that the rim is non-planar, and b) the lower lip of the retainer defines a second neck-clearance notch such that the lower lip is non-planar.

8. The winch system of claim 7, wherein the rim of the ball-receiving socket defines the first neck-clearance notch, and the winch system further comprises a bumper attached to the rim at the first neck-clearance notch, wherein the bumper has a Brinell hardness number of less than 100 BHN.

9. The winch system of claim 7, wherein the lower lip of the retainer defines the second neck-clearance notch, and the winch system further comprises a bumper attached to the lower lip at the second neck-clearance notch, wherein the bumper has a Brinell hardness number of less than 100 BHN.

10. The winch system of claim 7, wherein the lower lip of the retainer has a Brinell hardness number of less than 100 BHN.

11. The winch system of claim 7, wherein the rim of the ball-receiving socket has a Brinell hardness number of less than 100 BHN.

12. The winch system of claim 7, wherein the retainer comprises a nut and a ball lock, the draw pin extends through the ball lock, the nut threadingly engages the lower end of the draw pin, the ball lock engages the tow ball when the tow ball is within the ball-receiving socket with the draw pin in the lock position.

13. The winch system of claim 12, wherein the nut engages the tow ball to limit a degree to which the cup plate can pivot relative to the tow ball when the tow ball is within the ball-receiving socket with the draw pin in the lock position.

\* \* \* \* \*